United States Patent [19]

Tsurubayashi et al.

[11] Patent Number: 5,404,299
[45] Date of Patent: Apr. 4, 1995

[54] ELECTRONIC DICTIONARY SYSTEM

[75] Inventors: Ken Tsurubayashi, Tokyo; Atsushi Ando, Yokohama; Yuji Kanno, Kawasaki; Masao Ito, Tokyo; Noboru Tamura, Osaka; Kazuaki Kurachi, Tokyo, all of Japan

[73] Assignee: Matsushita Electric Industrial Co., Ltd., Osaka, Japan

[21] Appl. No.: 53,290

[22] Filed: Mar. 28, 1993

[30] Foreign Application Priority Data

Apr. 30, 1992 [JP] Japan .................................. 4-111426

[51] Int. Cl.⁶ .............................................. G06F 15/20
[52] U.S. Cl. ............................ 364/419.11; 364/419.01
[58] Field of Search ............ 364/419.1, 419.11, 419.13, 364/419.01

[56] References Cited

U.S. PATENT DOCUMENTS

| | | | |
|---|---|---|---|
| 4,580,218 | 4/1986 | Raye | 364/419.13 |
| 5,099,426 | 3/1992 | Carlgren et al. | 364/419.13 |
| 5,122,951 | 6/1992 | Kamiya | 364/419.13 |
| 5,151,857 | 9/1992 | Matsui | 364/419.13 |

Primary Examiner—Gail O. Hayes
Assistant Examiner—Jennifer L. Hazard
Attorney, Agent, or Firm—Lowe, Price, LeBlanc & Becker

[57] ABSTRACT

A concept dictionary management device includes a fundamental concept dictionary data holding portion for holding fundamental concept network connection information which represents fundamental concept network connections among words stored in a concept dictionary, a first supplemental concept dictionary data holding portion for holding first supplemental concept network connection information to be used for adding words to and deleting words from the concept network connections represented by the fundamental concept network connection information, a second supplemental concept dictionary data holding portion for holding second supplemental concept network connection information to be used only for personal use, to add one or more words to and deleting one or more words from the concept network connections obtained as a result of an addition or a deletion of the words connection by using the first supplemental concept network connection information, a concept dictionary retrieval portion for retrieving a concept network connection including an input word from the fundamental concept dictionary data holding portion, from the first supplemental concept dictionary data holding portion and from the second supplemental concept dictionary data holding portion, and an operation control portion for receiving concept network connection information representing the concept network connection retrieved by the concept dictionary retrieval means and for extracting a word from the received network connection information and outputting data indicating the extracted word to the concept dictionary retrieval portion as data indicating an input word.

3 Claims, 5 Drawing Sheets

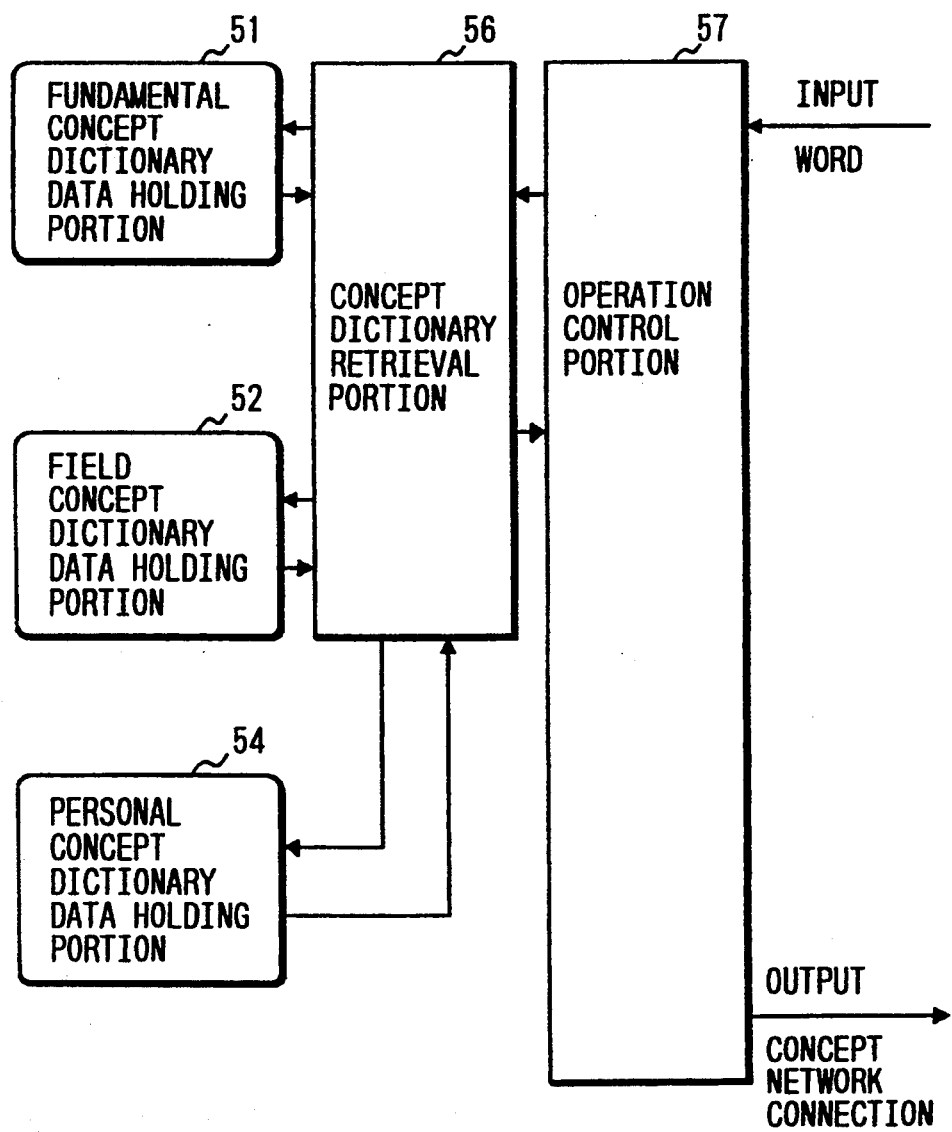

FIG. 6

| BIT | "0" | "1" |
|---|---|---|
| a (d=0) | NOT RETRIEVED FROM 2ND SUPPLEMENTAL CONCEPT DICTIONARY DATA HOLDING MEANS | FOUND OR RETRIEVED FROM 2ND SUPPLEMENTAL CONCEPT DICTIONARY DATA HOLDING MEANS |
| b (d=0) | NOT RETRIEVED FROM 1ST SUPPLEMENTAL CONCEPT DICTIONARY DATA HOLDING MEANS | FOUND OR RETRIEVED FROM 1ST SUPPLEMENTAL CONCEPT DICTIONARY DATA HOLDING MEANS |
| c (d=0) | NOT RETRIEVED FROM FUNDAMENTAL CONCEPT DICTIONARY DATA HOLDING MEANS | FOUND OR RETRIEVED FROM FUNDAMENTAL CONCEPT DICTIONARY DATA HOLDING MEANS |
| d | EXPAND NETWORK CONCERNING WORD | REDUCE NETWORK CONCERNING WORD |
| a (d=1) | | FOUND IN 2ND SUPPLEMENTAL CONCEPT DICTIONARY DATA HOLDING MEANS |
| b (d=1) | | FOUND IN 1ST SUPPLEMENTAL CONCEPT DICTIONARY DATA HOLDING MEANS |

ELECTRONIC DICTIONARY SYSTEM

BACKGROUND OF THE INVENTION

1. Field of The Invention

This invention generally relates to an electronic dictionary system (namely, a computerized dictionary system) and more particularly to a device (hereunder sometimes referred to as a concept dictionary management device) for managing what is called a concept dictionary in which words of an electronic dictionary are connected as networks (for instance, semantic networks) representing relationships among concepts.

2. Description of The Related Art

In recent years, there has been high interest in application of a concept dictionary management device to, for example, an expansion of a key word used for full text retrieval of information on documents.

Hereinafter, a conventional concept dictionary management system will be described. FIG. 5 is a schematic block diagram for illustrating the configuration of the conventional concept management device. In this figure, reference numeral 51 designates a fundamental concept dictionary data holding portion, or fundamental concept dictionary for holding fundamental information (hereunder sometimes referred to as fundamental concept network connection information) on connection (hereunder sometimes referred to as concept network connection, wherein a concept network connection is defined as a tree network in which a plurality of words are represented as nodes and are connected with each other on the basis of a common concept) among words connected as networks, which is used in common by a plurality of users; 52 a field concept dictionary data holding portion, or concept field of use dictionary which is used by a plurality of users in relation only to a particular field or sphere in which the fundamental concept dictionary is utilized, for holding concept network connection information (wherein concept network connection information is defined as information representing the words, as well as the connecting relations among the words, included in a concept network connection) used to add supplemental concept network connection information, which corresponds to each field or sphere employed in the concept dictionary management system, to the fundamental concept network connection information held by the fundamental concept dictionary 51; 54 a personal concept dictionary data holding portion, or personnel concept dictionary, for holding concept network connection information used by a user to personally add supplemental concept network connection information to the fundamental concept network connection information which is stored in the fundamental concept dictionary 51 and is regulated by using information held by the concept field use of dictionary 52; 56 a concept dictionary retrieval portion for retrieving concept network connection information concerned with a given word from one of the dictionaries 51, 52 and 54; 57 an operation control portion for controlling an operation of the entire concept dictionary management system.

Next, an operation of the conventional concept management system will be described hereinbelow. First, when a word (hereunder referred to as an input word) is inputted from an external device to the operation control portion 57, the operation control portion 57 issues a retrieval command to the concept dictionary retrieval portion 56 and gives the input word in order to get concept network connection information relating to this input word from the concept network connection information held in the fundamental concept dictionary 51. Then, the concept dictionary retrieval portion 56 retrieves concept network connection information relating to the given input word from the fundamental concept dictionary 51 and returns the retrieved concept network connection information to the operation control portion 57. When the operation control portion 57 receives concept network connection information from the concept dictionary retrieval portion 56, the portion 57 extracts words which are present in the received concept network connection information. Further, the portion 57 directs the concept dictionary retrieval portion 56 to retrieve concept network connection information from the field concept dictionary data holding portion, i.e., from the concept field of use dictionary 52 and gives the extracted words to the portion 56 with intention of checking expansions of concepts (namely, expansions of networks representing relationships among concepts (hereunder sometimes referred to as concept expansions)) regarding each of the extracted words according to the information held in the field concept dictionary data holding portion 52. Then, the concept dictionary retrieval portion 56 retrieves Concept network connection information held in the concept field of use dictionary 52 regarding each of the given words therefrom and returns a result of the retrieval to the operation control portion 57. When the operation control portion 57 receives the retrieved concept network connection information from the concept dictionary retrieval portion 56, the portion 57 performs what is called a "fusion" of the concept network connection information retrieved from the fundamental concept dictionary 51 and that retrieved from the concept field of use dictionary 52. Thus the portion 57 generates new concept network connection information which reflects an addition of the result of checking a concept expansion concerning each of the extracted words in the field concept dictionary data holding portion 52, i.e., the concept field of use dictionary to that of checking a corresponding concept expansion in the fundamental concept dictionary data holding portion 51, i.e., the fundamental concept dictionary. Further, the operation control portion 57 extracts words included in the new concept network connection information and directs the concept dictionary retrieval portion 56 to retrieve information from the personal concept dictionary 54 and gives the extracted words, which are extracted from the new concept network connection information, to the concept dictionary retrieval portion 56 as input words thereto, for the purpose of checking a concept expansion concerning each of the extracted words in the personal concept dictionary 54. Subsequently, the concept dictionary retrieval portion 56 retrieves concept network connection information concerning the given word from the personal concept dictionary data holding portion 54 and thereafter the portion 56 returns a result of the retrieval to the operation control portion 57. Then, the portion 57 generates further new concept network connection information by introducing the result of the retrieval from the personal concept dictionary data holding portion 54 into the concept network connection information generated as the results of the retrieval from the fundamental concept data holding portion 51 and the concept field of use dictionary 52.

Next, in order to check whether or not a further concept expansion of each of the words included in the concept network connection information added by the field concept dictionary data holding portion 52 can be detected on the basis of the information held in the fundamental concept dictionary data holding portion 51 or whether or not a further concept expansion of each of the words included in the concept network connection information added by the personal concept dictionary data holding portion 54 can be detected on the basis of the information held in the fundamental concept dictionary data holding portion 51 and that held in the field concept dictionary data holding portion 52, the operation control portion 57 extracts words from the concept network connection information concerning the input words, which is generated from the result of the retrieval from each of the concept dictionaries 51, 52 and 54. Further, the portion 57 retrieves words in the fundamental concept dictionary data holding portion 51, which are not included in the concept network connection information obtained as the result of the last retrieval from the fundamental concept dictionary 51. Then, the portion 57 modifies or corrects the concept network connection information. Moreover, the operation control portion 57 performs similar retrieval in each of the field concept dictionary data holding portion 52 and the personal concept dictionary data holding portion 54 once again. Concept network connection information concerning each of the words, which appear in the concept network connection information concerning the input words held in the operation control portion 57, is repeatedly searched for until the information held in all of the concept dictionary data holding portions dictionaries 51, 52 and 54 is searched. Upon completion of this search, resultant concept network connection information is outputted to an external device as concept network connection information concerning the input words.

Incidentally, information indicating whether or not the checking of words appearing in the concept network connection information corresponding to the input word, which information is held in each of the concept dictionary data holding portions 51, 52 and 54 is completed (namely, information indicating whether or not the searching of each of the information held in the portions 51, 52 and 54 for words appearing in the concept network connection information corresponding to the input word is completed) is represented by using a 3-bit flag consisting of three bits a, b and c which is established or set correspondingly to each word appearing in the concept network connection information when this information is processed in the operation control portion 57 as described above. Namely, in case where bit a is 1, it is indicated that the corresponding word is detected from the fundamental concept dictionary data holding portion 51 or the concept expansion to be performed on the corresponding word is completed in the fundamental concept dictionary data holding portion 51. Further, in case where bit b is 1, it is indicated that the corresponding word is detected from the field concept dictionary data holding portion 52 or the concept expansion to be performed on the corresponding word is completed in the field concept dictionary data holding portion 52. Moreover, in case where bit c is 1, it is indicated that the corresponding word is detected from the personal concept dictionary data holding portion 54 or the concept expansion to be performed on the corresponding word is completed in the personal concept dictionary data holding portion 54. Thus the concept expansion is prevented from being performed on the same word in the same concept dictionary a plurality of times. FIG. 4 illustrates the retrieval processing of concept network connection information to be performed in the conventional concept management device. Incidentally, in this figure, each graph (namely, each network of nodes connected by arrows) represents a concept network connection. Further, each node designates a word represented by a Japanese character ア, イ, ... or ホ.

Thus, in case of the conventional device, the addition of information to the concept network connection information held in the fundamental dictionary data holding portion 51 can be effected by using the supplemental concept network connection information held in the field concept dictionary data holding portion 52 and the personal concept dictionary data holding portion 54. Consequently, an environment, in which a concept expansion is performed on the input word (namely, the network corresponding to the input word (hereunder sometimes referred to as the concept range of the input word) is expanded), can be provided to each user. However, in case of the conventional device, the concept network connection information corresponding to an input word, which is held in the fundamental concept dictionary data holding portion 51, cannot be reduced. Thus, an environment in which the concept range of the input word is reduced, cannot be provided to each user. This is disadvantageous when concept expansion is performed on a key word used for full text retrieval by using the concept dictionary. Further, an unnecessary concept expansion performed on the key word results in retrieval of unnecessary information or documents.

The present invention is accomplished to eliminate the above described drawback of the conventional device.

It is, therefore, an object of the present invention to provide a concept dictionary management device which can expand and reduce concept network connection information held in a fundamental concept dictionary data holding portion used in common by a plurality of users without rewriting the concept network connection information thereby performing full text retrieval at a high speed.

SUMMARY OF THE INVENTION

To achieve the foregoing object, and in accordance with the present invention, there is provided a concept dictionary management device which includes a fundamental concept dictionary data holding means for holding fundamental concept network connection information which represents fundamental concept network connections among words stored in a concept dictionary. Further, there is included a first supplemental concept dictionary data holding means for holding first supplemental concept network connection information to be used for adding words to and deleting words from the concept network connections represented by the fundamental concept network connection information. Also included in the invention is a second supplemental concept dictionary data holding means for holding second supplemental concept network connection information, to be used only for personal use, to add one or more words to and to delete one or more words from the concept network connections obtained as a result of an addition or a deletion of the words by using the first supplemental concept network connection information.

The invention further includes a concept dictionary retrieval means for retrieving a concept network connection including an input word from the fundamental concept dictionary data holding means, from the first supplemental concept dictionary data holding means and from the second supplemental concept dictionary data holding means; and an operation control means for receiving concept network connection information representing the concept network connection retrieved by the concept dictionary retrieval means and for extracting a word from the received network connection information and outputting data indicating the extracted word to the concept dictionary retrieval means as data indicating an input word.

Incidentally, it is noted that each of the fundamental, first supplemental, and second supplemental concept dictionary data holding means, holds concept network connection information. Further, the fundamental concept dictionary is fundamental in the respect that the concept network connection information held therein can be used by all users of a concept dictionary to be managed by the device of the present invention. Further, the first supplemental concept dictionary data holding means holds information for expansion or reduction of concept network connection. Namely, the first supplemental concept dictionary contains information on positive or negative concept network connections (to be described later) to add words to or reduce words from the concept network connection, which is represented by the concept network connection information held in the fundamental concept dictionary (hereunder sometimes referred to as the fundamental concept network connection information). Moreover, the second supplemental concept dictionary holds information for expansion or reduction of concept network connection. Namely, the second supplemental concept dictionary contains information on positive or negative concept network connections (to be described later) to add words to or reduce words from the concept network connection represented by the fundamental concept network connection information, only for individual use. In short, the first fundamental concept dictionary is used to add one or more words correspondingly to each field to the fundamental concept network connection information held in the fundamental concept dictionary data holding means (or to reduce such words from the fundamental concept network connection information). Moreover, the second supplemental concept dictionary data holding means is used to add one or more words to (or reduce such words from) the fundamental concept network connection information held in the fundamental concept dictionary data holding means, only for individual or personal use.

Furthermore, among the concept network connection information stored in the fundamental concept dictionary, the first supplemental concept dictionary and the second supplemental concept dictionary, a highest priority is assigned to the concept network connection information stored in the second supplemental concept dictionary. Still further, a second highest priority is assigned to the concept network connection information stored in the first supplemental concept dictionary. Additionally, a lowest priority is assigned to the concept network connection information stored in the fundamental concept dictionary. In the concept dictionary management device of the present invention, according to such priorities, the concept network connection information including an input word is retrieved from the fundamental concept dictionary, the first supplemental concept dictionary and the second supplemental concept dictionary, and the fusion of concept network connection is performed.

In accordance with another embodiment of the invention, a priority assigned to the second supplemental concept network connection information held in the second supplemental concept dictionary data holding means is higher than a priority assigned to the first supplemental concept network connection information held in the first supplemental concept dictionary data holding means. Moreover, a retrieval from the second supplemental concept dictionary data holding means of a concept network connection, which includes a word inputted from an external device, is preferentially effected before a retrieval from the first supplemental concept dictionary data holding means of a concept network connection which include the inputted word.

In the concept dictionary management device of the present invention having the above described configuration, when a concept expansion is performed on an input word supplied from an external device, the operation control means first causes the concept dictionary retrieval means to retrieve concept network connection information from the second supplemental concept dictionary data holding means and receives the retrieved concept network connection information and extracts words from the received concept network connection information. Further, the operation control means selects only words, which are described or written for the purpose of effecting an expansion of the concept network connection of an input word, and sets a concept network connection of each of the selected words as objects to be retrieved from the first supplemental concept dictionary data holding means. (Incidentally, the operation control means does not select words described or written for the purpose of effecting a reduction of the concept network connection of an input word. Thus a retrieval of a concept network connection of such a word from the first supplemental concept dictionary data holding means is not performed.) The results of the retrievals from the second and first supplemental concept dictionaries are fused. Specifically, a result of the retrieval of a concept network connection of each of the selected words from the first concept dictionary data holding means and the result of the retrieval from the second concept dictionary data holding means, which is caused by the operation control means prior to the retrieval from the first supplemental concept dictionary data holding means, are then "fused".

In case where conflicting matters are shown by information on the two concept network connections respectively retrieved from the first and second supplemental concept dictionary data holding means, the information on the concept network connection retrieved from the second supplemental concept dictionary data holding means has priority over that on the concept network connection retrieved from the first supplemental concept dictionary data holding means. For example, it is supposed that a result of the retrieval of a concept network connection from the second supplemental concept dictionary data holding means indicates that a concept expansion of a word A to a word B is cancelled (namely, a network (i.e., a concept network connection) including the word A to be expanded is not expanded in such a manner to include the word B). Further, it is assumed that in contrast, a result of the retrieval of a concept network connection from the first supplemental concept dictionary data holding means indicates that a concept expansion of a word A to a word B is performed (namely, the network including the word A to be expanded is expanded in such a manner to include the word B). In such a case, the result of the retrieval of a concept network connection from the second supplemental concept dictionary data holding means has priority. Therefore, the network (i.e., a concept network connection) including the word A to be expanded is not expanded in such a manner to include the word B.

Subsequently, the operation control means extracts words from new concept network connection information obtained as the result of the "fusion" (namely, information on the new concept network connection obtained as the result of the "fusion"). Incidentally, in the instant application, the "fusion" of a plurality of concept network connections is defined as a uniting of the plurality of concept network connections as a new concept network connection. However, among the extracted words, only the words written or included in the information with intention of expanding the concept network connection are used in a retrieval of a concept network connection from the fundamental concept dictionary data holding means. In other words, only a concept network connection having the word included in the information as permitting the concept expansion (namely, as not cancelling the concept expansion) is retrieved from the fundamental concept dictionary data holding means. Then, the retrieval of a concept network connection from the fundamental concept dictionary data holding means is effected. Subsequently, a concept network connection obtained as the result of such a retrieval and the current concept network connection including the input word (namely, the concept network connection obtained by the "fusion" of the concept network connections retrieved from the first and second supplemental concept dictionary data holding means) are "fused" to obtain a new concept network connection including the input word. Thus new concept network connection information representing the new concept network connection this time is generated by fusing concept network connection information obtained as the result of such a retrieval and the current concept network connection information which represents the network connection obtained by the "fusion" of the concept network connections retrieved from the first and second supplemental concept dictionary data holding means. At that time, if this new concept network connection information indicates a matter conflicting with a matter indicated by the concept network connection information which represents the network connection obtained by the "fusion" of the concept network connections retrieved from the first and second supplemental concept dictionary data holding means, the latter concept network connection information has priority Over this new concept network connection information.

Here, there is a possibility that a word added as the retrieval from the first supplemental concept dictionary data holding means is included in (namely, indicated by) information held in the second supplemental concept dictionary data holding means or that a word added as the retrieval from the fundamental concept dictionary data holding means is included in information held in the second or first supplemental concept dictionary data holding means. Thus such searches or retrievals are repeated effected. Upon completion of checking all of words included in the concept network connection information concerning the input word in the fundamental concept dictionary data holding means and the first and second supplemental concept dictionary data holding means, the concept network connection information held in the operation control means is outputted therefrom.

As described above, in case of the concept dictionary management device of the present invention, a retrieval of a concept network connection is started from the second supplemental concept dictionary data holding means having high priority. Thereby, the device of the present invention can prevent a wasteful retrieval of a concept network connection, which would occur in the conventional device, for instance, in case where a concept network connection retrieved from the fundamental concept dictionary data holding means having a large quantity of information or data becomes unnecessary when checking the information held in a supplemental concept dictionary data holding means having a higher priority after the retrieval from the fundamental concept dictionary data holding means. Consequently, an efficient management of a concept dictionary can be achieved.

Furthermore, as stated above, in case of the concept dictionary management device of the present invention, a concept network connection can be not only added (namely, expanded) but also deleted (namely, reduced) by employing the first and second supplemental concept dictionary data holding means, in which there is set information on the concept network connection to be changed. In the fundamental concept dictionary data holding means, the contents cannot be changed (namely, the change of the contents therein is not permitted). Thereby, efficiency in full text retrieval can be increased. Further, a more sufficient concept expansion can be performed on an input word. Moreover, an excellent concept dictionary fully suitable for user's purpose can be realized.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which:

FIG. 5 is a schematic block diagram for illustrating the configuration of the conventional concept dictionary management device; and FIG. 6 is a diagram for illustrating the meaning of each flag bit of FIG. 2.

DETAILED DESCRIPTION OF THE PREFERRED EMBODIMENT

Hereinafter, the preferred embodiment of the present invention will be described in detail by referring to the accompanying drawings.

Figure 1:
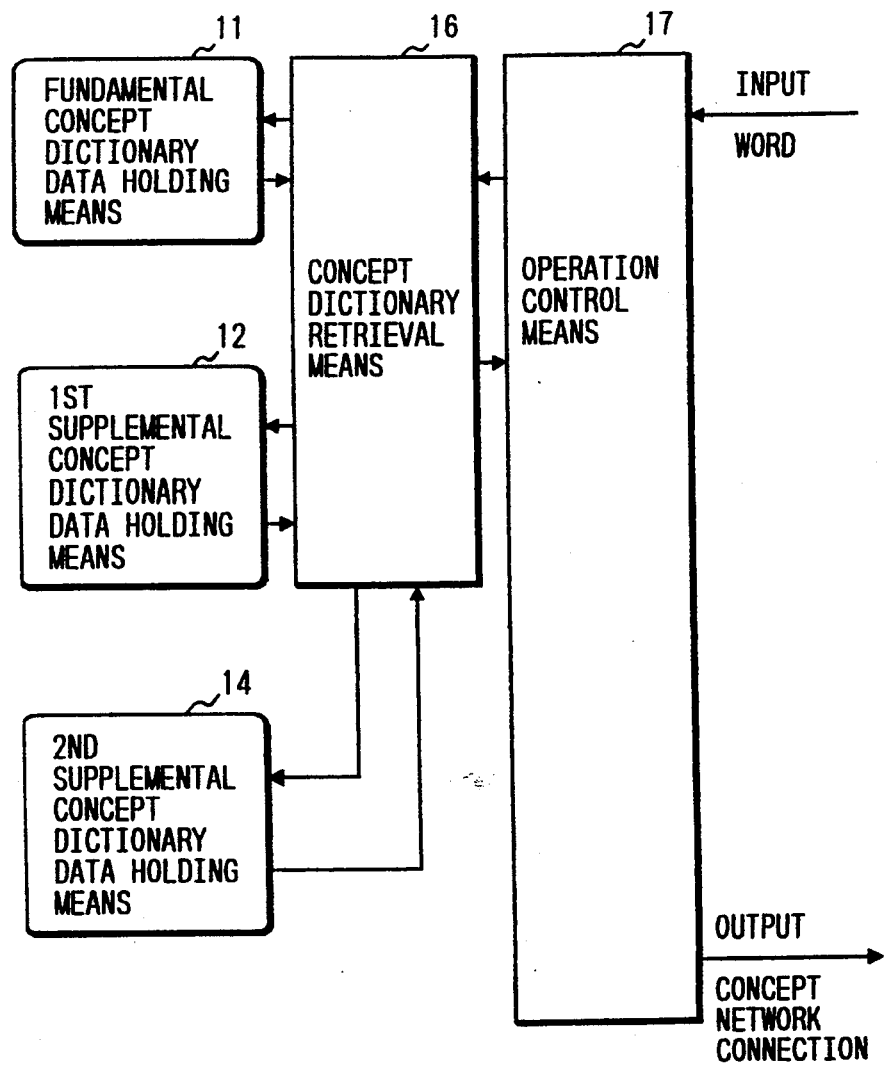
FIG. 1 is a schematic block diagram for illustrating the configuration of a concept dictionary management device embodying the present invention.

FIG. 1 is a schematic block diagram for illustrating the configuration of a concept dictionary management device embodying the present invention (namely, the embodiment of the present invention). In this figure, reference numeral 11 designates a fundamental concept dictionary data holding means, or fundamental concept dictionary the contents of which are referred to by a plurality of users and cannot be changed as suitable for personal use or a field of utilization of a concept dictionary; 12 designates a first supplemental concept dictionary data holding means or first supplemental concept dictionary for making a modification, which relates to a particular field of utilization of the concept dictionary. The first supplemental concept dictionary modifies the concept network connection information held in the fundamental concept dictionary 11 by adding information on a word to concept network connection information held in the fundamental concept dictionary 11 or by deleting information on a word from the concept network connection information held in the fundamental concept dictionary 11 (incidentally, there may be provided a plurality of first supplemental concept dictionary data holding means corresponding to the single fundamental concept dictionary data holding means 11); 14 designates a second supplemental concept dictionary data holding means (or second supplemental concept dictionary) for making a further modification, which relates to a user's personal purpose or use, in the concept network connection information held in the fundamental concept dictionary data holding means 11, in addition to the modification based on the concept network connection information held in the first supplemental concept dictionary data holding means 12. The second supplemental concept dictionary makes the further modification by adding information on a word to the concept network connection information obtained as the result of the modification based on the information held ill the means 12, or by deleting information on a word from the information obtained as the result of the modification based on the information held in the means 12 (incidentally, there may be provided a plurality second supplemental concept dictionary data holding means of the number equal to that of users); 17 designates an operation control means for controlling operations of the entire concept dictionary management device from the input of a word from an external device to the output of the finally obtained concept network connection information; and 16 designates a concept dictionary retrieval means for retrieving a concept network connection information concerning a given word (namely, an input word) from the concept dictionary data holding means which is selected from the fundamental, first supplemental and second supplemental concept dictionaries 11, 12 and 14 and indicated by the operation control means 17.

Figure 2:
FIG. 2 is a diagram for illustrating flag bits employed in the embodiment of FIG. 1, which are established correspondingly to each of extracted words.

Hereinafter, an operation of the concept dictionary management device having the above described configuration will be described. First, in case where a plurality of the first supplemental concept dictionary data holding means 12 are provided in this concept dictionary management device, a user should select one of the first supplemental concept dictionary data holding means 12 and notify the operation control means 17 of the selected one of the first supplemental concept dictionary data holding means 12. The operation control means 17 receives a direction indicating the selected one of the first supplemental concept dictionary data holding means 12 from the user and establishes the combination or system consisting of the fundamental concept dictionary data holding means 11, the selected one of the first supplemental concept dictionary data holding means 12 and the second supplemental concept dictionary data holding means 14 belonging to the user as illustrated in FIG. 1. Subsequently, the operation control means 17 receives a word inputted from the user and then sets a 4-bit flag comprised of bits a, b, c and d correspondingly to the input word and attaches this flag to the input word as illustrated in FIG. 2.

FIG. 6 illustrates the meaning of each bit of this flag. If the bit d is "0", it is signified that the input word is a word appearing in a positive concept network connection which indicates that the concept of the word is expanded (namely, another word connected to the input word is used to expand the concept network connection). Incidentally; in the instant application, a positive concept network connection is defined as a concept network connection formed by two words, which is operative to add one of the words to another concept network connection, to which the other of the words further belongs, when implementing a "fusion" of this concept network connection and the positive concept network connection. (Thus, the expansion of a concept network connection by a positive concept network is the fusion of the concept network connection and the positive concept network.) Further, if the bit d is "1", it is signified that the input word is a word appearing in a negative concept network connection which indicates that the concept of the word is reduced (namely, a word connected to the input word is deleted from the concept network connection). Incidentally, in the instant application, a negative concept network connection is defined as a concept network connection formed by two words, which is operative to delete one of the words from another concept network connection, to which the other of the words further belongs, when implementing a "fusion" of this concept network connection and the negative concept network connection. (Thus, the reduction of a concept network connection by a negative concept network is the fusion of the concept network connection and the negative concept network.) Further, in case where the bit d is "0", if the bit a is "1", it is signified that the word to which the bit a is attached is found when retrieving a concept network connection from the second supplemental concept dictionary data holding means 14 or that the retrieval of a concept network connection including this word from the means 14 is completed. Further, if the bit a is "0", it is signified that the retrieval of a concept network connection including this word from the means 14 is not performed yet. Furthermore, in case where the bit d is "0", if the bit h is "1", it is signified that the word to which the bit b is attached is found when retrieving a concept network connection from the selected one of the first supplemental concept dictionary data holding means 12 or that the retrieval of a concept network connection including this word from the selected one of the means 12 is completed. Further, if the bit b is "0", it is signified that the retrieval of a concept network connection including this word from the selected one of the means 12 is not performed yet. Additionally, in case where the bit d is "0", if the bit c is "1", it is signified that the word to which the bit h is attached is found when retrieving a concept network connection from the fundamental concept dictionary data holding means 11 or that the retrieval of a concept network connection including this word from the means 11 is completed. Further, if the bit c is "0", it is signified that the retrieval of a concept network connection including this word from the means 11 is not performed yet. In case where the bit d is "1", if the bit a is "1", it is signified that the word to which the flag is attached appears (namely, is found) when retrieving a concept network connection from the second supplemental concept dictionary data holding means 14. Further, if the bit b is "1", it is signified that the word appears when retrieving a concept network connection from the selected one of the first supplemental concept dictionary data holding means 12.

The operation control means 17 first attaches the flag, of which all of the four bits are set as "0", to the word received from the user. Then, the operation control means 17 causes the concept dictionary retrieval means 16 to retrieve a concept network connection concerning the word, to which the flag is attached, from the fundamental concept dictionary data holding means 11, the selected one of the first supplemental concept dictionary data holding means 12 and the second supplemental concept dictionary data holding means 14. At that time, the retrieval of such a concept network connection from the second supplemental concept dictionary data holding means 14 is first effected. Concept network connection information obtained as the result of this retrieval is held in the operation control means 17. Further, the means 17 extracts words included in the concept network connection information held therein. Then the means 17 attaches the 4-bit flag of FIG. 2 to each of the extracted words again. Among the extracted words, the word, the corresponding bit d of which is "0", is used in retrieval of a concept network connection from the selected one of the means 12 (namely, a concept network connection including such a word is retrieved from the selected one of the means 12). Concept network connection information obtained as the result of this retrieval and the concept network connection information obtained at the time of the retrieval from the second supplemental concept dictionary data holding means 14 are "fused" Here, note that the concept network connection information obtained at the time of the retrieval from the second supplemental concept dictionary data holding means 14 has priority over that obtained by the retrieval from the selected one of the first supplemental concept dictionary data holding means 12. Therefore, if a matter included in the former information conflicts with that included in the latter information, the former information (namely, the information obtained as the result of the retrieval from the second supplemental concept dictionary data holding means 14) has priority over the latter information. Further, new concept network connection information generated as the result of this "fusion" is held in the operation control means 17. Then, the operation control means 17 extracts words included in (or indicated by) this new concept network connection information and adds the 4-bit flag to each of the words extracted this time once again. Further, the extracted words are employed for retrieval of a concept network connection from the fundamental concept dictionary data holding means 11. Subsequently, concept network connection information obtained as the result of this retrieval from the means 11 and the new information held in the operation control means are further "fused".

Incidentally, the flag added to each word is updated according to the rule of FIG. 6 when effecting the retrievals from the concept dictionary data holding means 11, 12 and 14. Upon completion of the retrieval of the concept network connection from the fundamental concept dictionary data holding means 11, words included in the latest concept network connection information obtained as the result of the "fusions" effected till then are checked. If the bit d corresponding to a word is "0" but all of the corresponding bits a, b and c are not "1", the retrieval from the second supplemental concept dictionary data holding means 14, that from the selected one of the first supplemental concept dictionary data holding means 12 and that from the fundamental concept dictionary data holding means 11 are effected again in this order. If all of the bits a, b and c corresponding to each word, the corresponding bit d of which is "0", are "1", the retrieval of a concept network connection concerning each of the words inputted by the user is finished. Then, the finally obtained concept network connection information is outputted from the device.

Figure 3:
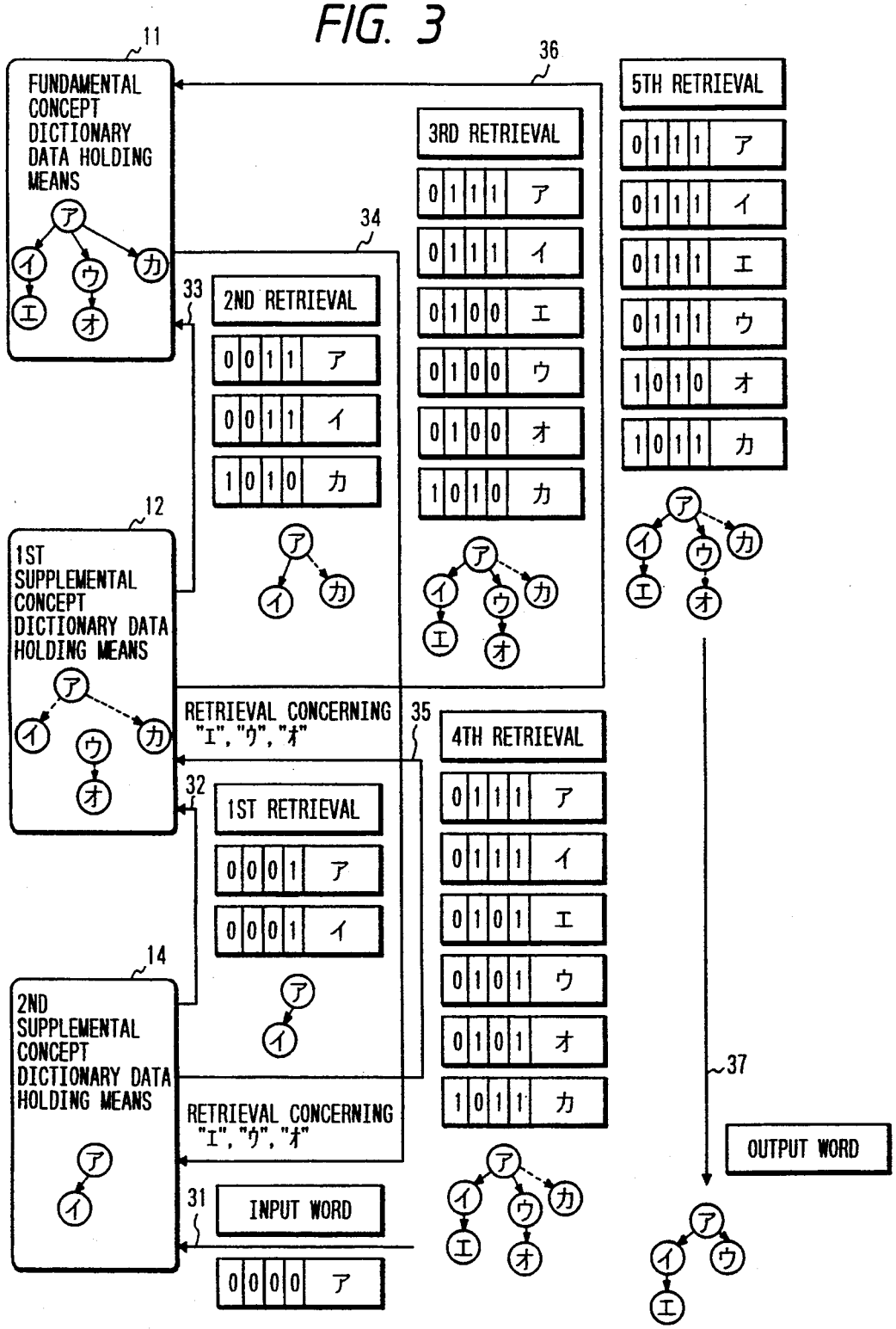
FIG. 3 is a diagram for illustrating an operation of retrieving a concept network connection to be performed in the embodiment of FIG. 1.
Figure 4:
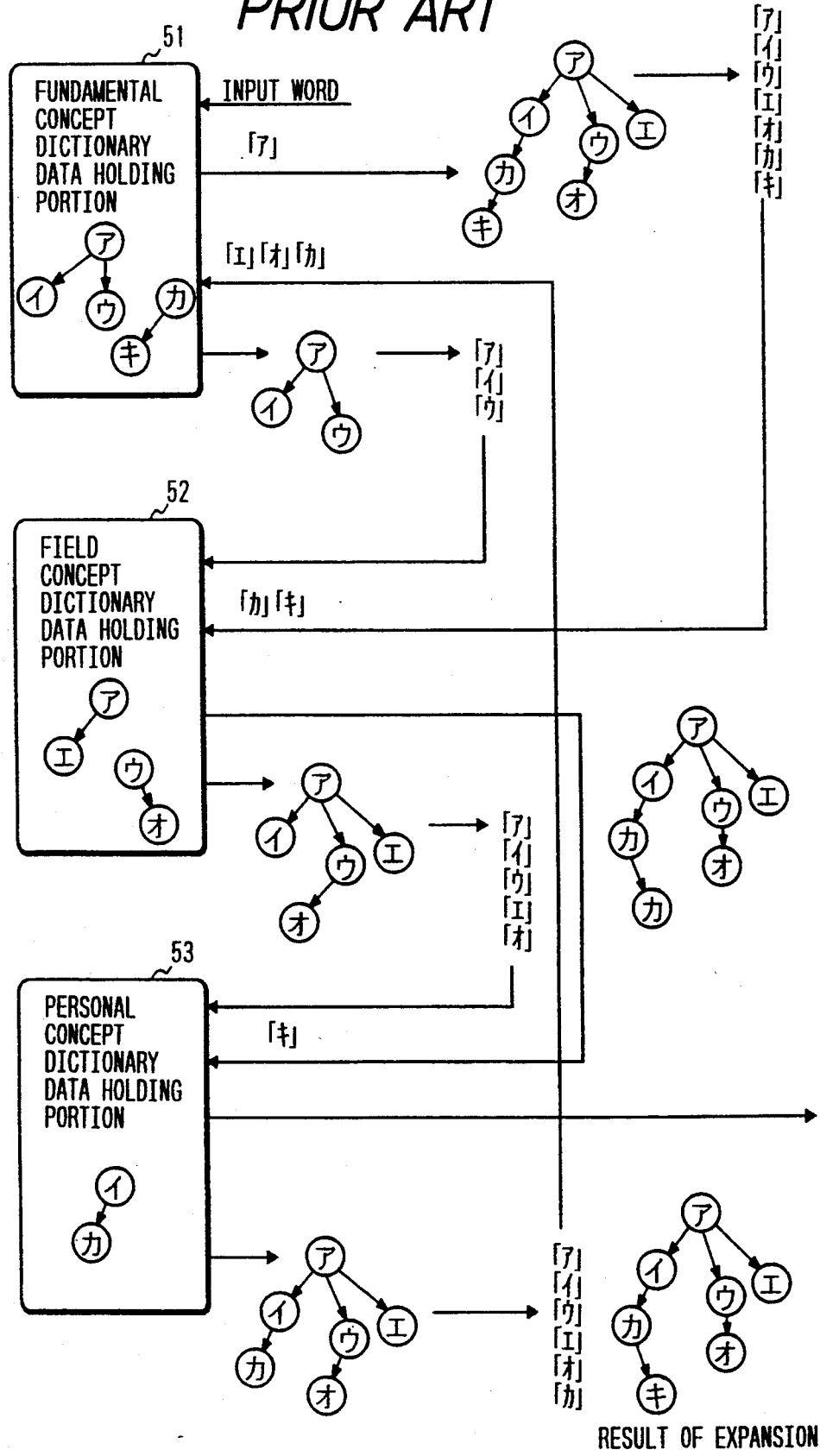
FIG. 4 is a diagram for illustrating an operation of retrieving a concept network connection to be performed in a conventional concept dictionary management device.

FIG. 3 illustrates an operation of the above described embodiment of the present invention in case of retrieving a concept network connection concerning a word " ア ", by way of example. First, in step 31, the 4-bit flag, all of the bits of which are "0", is added to this word and the resultant data (namely, the word with the flag) is inputted to the second supplemental concept dictionary data holding means 14. Then, the retrieval of a concept network connection concerning this word from the means 14 is effected. As shown in this figure, a concept network connection concerning the word " ア " (namely, the concept network connection information representing the relation " ア → イ ") is retrieved from the second supplemental concept dictionary data holding means 14 in this case. Thus, in step 32, the bits a and b of the flags corresponding to the words " ア " and " イ " are changed to "1". Further, these words are outputted together with such flags to the selected one of the first supplemental concept dictionary data holding means 12. Next, concept network connection information concerning the word " ア " (namely, the information indicating the relations " ア → イ " and " ア → カ ") is retrieved from the selected one of the first supplemental concept dictionary data holding means 12. However, this information is negative connection information indicating deletion of a word from the concept network connection. Thus the corresponding flag d becomes "1". In contrast, regarding the word " イ ", the result of the retrieval from the second supplemental concept dictionary data holding means 14 has priority. Therefore, in step 33, the bit d corresponding only to the word " カ " is changed to "1" (incidentally, regarding the position of the bit d, refer to FIG. 2) and then the words " ア ", " イ " and " カ " and the corresponding flags as illustrated in this figure are outputted to the fundamental concept dictionary data holding means 11. Next, concept network connection information concerning the word " ア " (namely, the information indicating the relations " ア → イ →I", " ア → ウ → オ " and " ア → カ ") is retrieved from the fundamental concept dictionary data holding means 11. However, regarding the word " カ ", the result of the retrieval from the second supplemental concept dictionary data holding means 14 has priority. Therefore, in step 34, the bit c corresponding to each of the words "ア", "イ", "I", "ウ" and "オ" other than the word "カ" is changed to "1". Then, these words and the corresponding flags are put back to the second supplemental concept dictionary data holding means 14. Subsequently, a concept network connection concerning each of the words "I", "ウ" and "オ" other than the word "ウ" to be deleted is retrieved from the means 14 again. Then, in step 35, the bit a corresponding to each of the words "ア","イ","I", "ウ","オ" and "ウ" is set as "1" which indicates that the retrieval from the second supplemental concept dictionary data holding means is completed. Further, these words and the corresponding flags are outputted to the selected one of the first supplemental concept dictionary data holding means 12. In the selected one of the means 12, a concept network connection concerning each of the words "I", "カ" and "オ" is similarly retrieved. However, the concept network connection information concerning the word "オ" is negative connection information which indicates deletion of this word. Thus, in step 36, the bit d corresponding to this word is changed as "1" Moreover, the bit b corresponding to this word, which indicates that the retrieval from the selected one of the first supplemental concept dictionary data holding means 12 is completed, is also changed as "1" Then, these words are outputted to the fundamental concept dictionary data holding means 11 together with the corresponding flags. As the result, in step 37, the operation control means 17 generates new concept network connection information concerning the word "ア" (namely, the information indicating the relations "ア → イ →I" and "ア → ウ" by deleting the words "オ" and "ウ" and outputs the new concept network connection information.

While a preferred embodiment of the present invention has been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. A concept dictionary management device comprising:

a fundamental concept dictionary data holding means for holding fundamental concept network connection information which represents fundamental concept network connections among words stored in a concept dictionary;

first supplemental concept dictionary data holding means for holding first supplemental concept network connection information to be used for adding words to and deleting words from the concept network connections represented by the fundamental concept network connection information;

second supplemental concept dictionary data holding means for holding second supplemental concept network connection information to be used, to add one or more words to and to delete one or more words from the concept network connections obtained as a result of an addition or a deletion of the words by using the first supplemental concept network connection information;

concept dictionary retrieval means for retrieving a concept network connection including an input word from the fundamental concept dictionary data holding means, from the first supplemental concept dictionary data holding means and from the second supplemental concept dictionary data holding means; and operation control means for receiving concept network connection information representing the concept network connection retrieved by the concept dictionary retrieval means and for extracting a word from the received network connection information and outputting data indicating the extracted word to the concept dictionary retrieval means as data indicating an input word.

2. The concept dictionary management device according to claim 1, wherein a priority assigned to the second supplemental concept network connection information held in the second supplemental concept dictionary data holding means is higher than a priority assigned to the first supplemental concept network connection information held in the first supplemental concept dictionary data holding means, and wherein a retrieval of a concept network connection, which includes a word inputted from an external device, from the second supplemental concept dictionary data holding means is preferentially effected before a retrieval of a concept network connection, which includes the inputted word, from the first supplemental concept dictionary data holding means.

3. A concept dictionary management device comprising:

a fundamental concept dictionary data holding means for holding fundamental concept network connection information which represents fundamental concept network connections among words stored in a concept dictionary and can be used by all users of the concept dictionary but can be changed only by permitted users;

first supplemental concept dictionary data holding means for holding first supplemental concept network connection information to be used for adding and deleting first concept network connections to and from the fundamental concept network connections represented by the fundamental concept network connection information, correspondingly to a field of utilization of the concept dictionary;

second supplemental concept dictionary data holding means for holding second supplemental concept network connection information to be used only for personal use, to add and to delete one or more second concept network connections to and from the concept network connections resulting from addition or deletion of the first concept network connections to the fundamental concept network connections;

concept dictionary retrieval means for retrieving a concept network connection including an input word from at least one of the fundamental concept dictionary data holding means, the first supplemental concept dictionary data holding means and the second supplemental concept dictionary data holding means; and operation control means for receiving concept network connection information representing the concept network connection retrieved by the concept dictionary retrieval means and for extracting information representing a word from the received network connection information and outputting data indicating the extracted word to the concept dictionary retrieval means as data indicating an input word.

* * * * *